US012753062B2

(12) United States Patent
Quataert et al.

(10) Patent No.: US 12,753,062 B2
(45) Date of Patent: Oct. 6, 2026

(54) BEVERAGE DISPENSING CONDUIT REDUCING MICROBIAL BACKFLOW

(71) Applicant: Heineken Supply Chain B.V., Amsterdam (NL)

(72) Inventors: Carine Godefrida Maria Quataert, Bilthoven (NL); Petronella Joanna Zeegers, Alphen aan den Rijn (NL); Peter Henri Samuel Wigman, Amsterdam (NL); Johann Antonius Gerardus Wilhelmus Zigmans, Utrecht (NL)

(73) Assignee: Heineken Supply Chain B.V., Amsterdam (NL)

(*) Notice: Subject to any disclaimer, the term of this patent is extended or adjusted under 35 U.S.C. 154(b) by 45 days.

(21) Appl. No.: 17/775,599

(22) PCT Filed: Nov. 30, 2020

(86) PCT No.: PCT/NL2020/050748

§ 371 (c)(1),
(2) Date: May 10, 2022

(87) PCT Pub. No.: WO2021/107780

PCT Pub. Date: Jun. 3, 2021

(65) Prior Publication Data

US 2022/0402744 A1 Dec. 22, 2022

(30) Foreign Application Priority Data

Nov. 29, 2019 (NL) ...................................... 2024345
Nov. 29, 2019 (NL) ...................................... 2024346
Aug. 31, 2020 (NL) ...................................... 2026380

(51) Int. Cl.
*B67D 1/08* (2006.01)

(52) U.S. Cl.
CPC ......... *B67D 1/0835* (2013.01); *B67D 1/0831* (2013.01); *B67D 1/0857* (2013.01);
(Continued)

(58) Field of Classification Search
CPC .. B67D 1/0835; B67D 1/0831; B67D 1/0857; B67D 1/0832; B67D 2210/0001;
(Continued)

(56) References Cited

U.S. PATENT DOCUMENTS 2,364,820 A * 12/1944 Rosander et al. ... B67D 1/1466 138/41
2,540,564 A * 2/1951 Leo ........................ B01D 35/02 210/448
(Continued)

FOREIGN PATENT DOCUMENTS

AU 2010273188 A1 2/2012
EP 0117656 A1 * 2/1984 ........... B65B 7/2842
(Continued)

OTHER PUBLICATIONS

Hahn ("Broad diversity of viable bacteria in 'sterile' (0.2 μm) filtered water", article in Research in Microbiology, vol. 155, Issue 8 , 2004, pp. 688-691, retrieved from https://www.sciencedirect.com/science/article/pii/S0923250804001287?via%3Dihub). (Year: 2004).*

(Continued)

*Primary Examiner* — Christopher M Afful
(74) *Attorney, Agent, or Firm* — Banner & Witcoff, Ltd.

(57) ABSTRACT

A fluid conduit 100 is provided for providing a fluid connection between a beverage container 201 and a beverage dispenser, comprising a conduit body 102 with a container side 103 and a dispenser side 105, in use downstream of the container side 103, wherein the conduit body 102 defines a flow path 107 through the fluid conduit 100 between the
(Continued)

container side 103 and the dispenser side 105, and a flow restrictor 104 provided in the flow path arranged to allow a flow of fluid from the container side 103 to the dispenser side 105, and at least substantially restrict passage of micro-organisms through the conduit body 102 from the dispenser side 105 to the container side 103.

23 Claims, 5 Drawing Sheets

(52) U.S. Cl.
CPC .... *B67D 1/0832* (2013.01); *B67D 2210/0001* (2013.01); *B67D 2210/00049* (2013.01)

(58) Field of Classification Search
CPC ........... B67D 2210/00049; B67D 2210/00002; B67D 2210/00005; B67D 2210/00013; B67D 2210/00018; B67D 2210/00047; B67D 2210/00057
USPC .............................................................. 141/3
See application file for complete search history.

(56) References Cited

U.S. PATENT DOCUMENTS 3,211,350 A * 10/1965 Brown ................. B67D 1/0412 239/533.13
4,940,542 A * 7/1990 Simizu .................... B05B 15/30 210/321.89
5,120,438 A * 6/1992 Nakagawa ........... B67D 7/0238 222/189.1
5,205,440 A 4/1993 Matsushita
5,901,747 A * 5/1999 Rokkjaer .............. F16L 37/252 137/212
6,082,389 A 7/2000 Latham et al.
10,639,656 B1 * 5/2020 Hammerlund .... B01F 33/50114
12,291,442 B2 5/2025 Wigman et al.
2006/0006195 A1 1/2006 Jones et al.
2006/0157515 A1 * 7/2006 Oswald .................... B67D 1/07 222/399
2010/0243676 A1 9/2010 Bax et al.
2010/0308084 A1 * 12/2010 Riis ...................... B67D 1/0832 222/400.7
2015/0028052 A1 1/2015 Rasmussen et al.
2017/0079469 A1 * 3/2017 Apone .................. A47J 31/467
2017/0156525 A1 * 6/2017 Guy ..................... A47G 21/185
2019/0144253 A1 5/2019 Peirsman et al.
2019/0169013 A1 6/2019 Paauwe et al.

FOREIGN PATENT DOCUMENTS

| | | | |
|---|---|---|---|
| EP | 0338844 | B1 | 6/1996 |
| EP | 2623455 | A1 | 8/2013 |
| EP | 3244157 | A1 | 11/2017 |
| GB | 344376 | | 3/1931 |
| GB | 2421493 | A | 6/2006 |
| JP | H11344141 | A | 12/1999 |
| WO | 2006060890 | A1 | 6/2006 |
| WO | 2017/058259 | A1 | 4/2017 |

OTHER PUBLICATIONS

International Search Report for corresponding International Application No. PCT/NL2020/050748, dated Feb. 9, 2021, 7 pages.
Nov. 14, 2024 (EP) Examination Report Application No. 20820578.1.

* cited by examiner

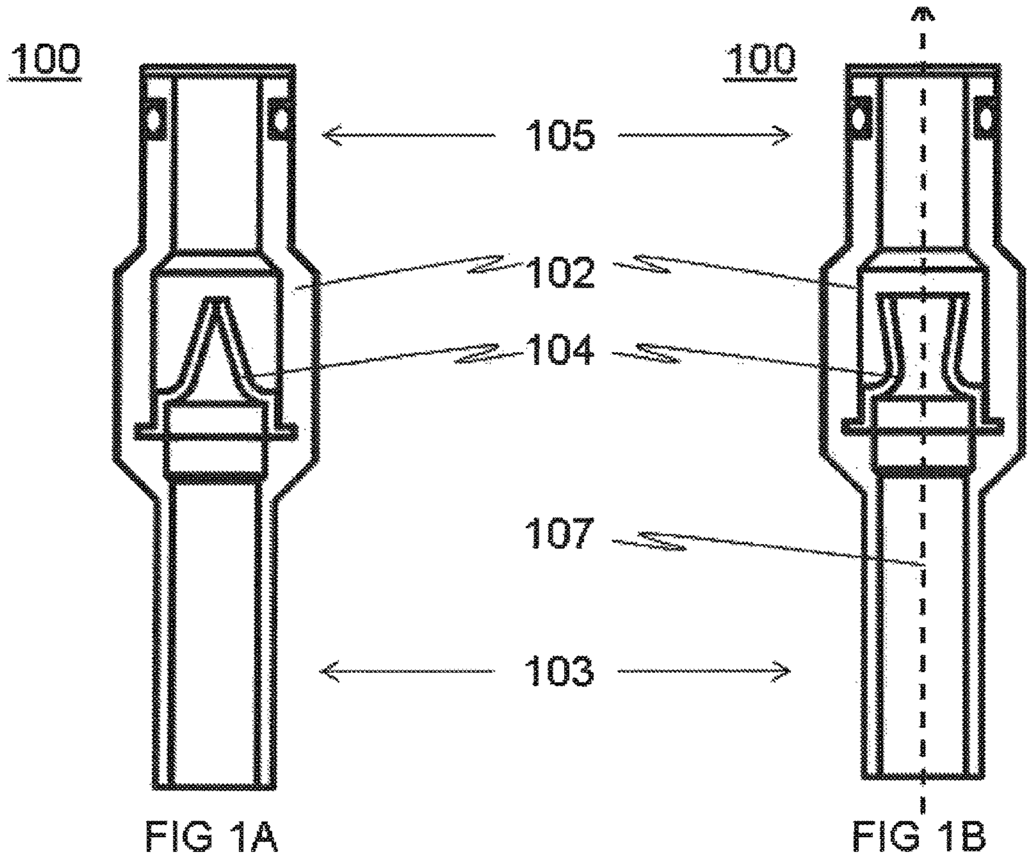
FIG 1A
FIG 1B
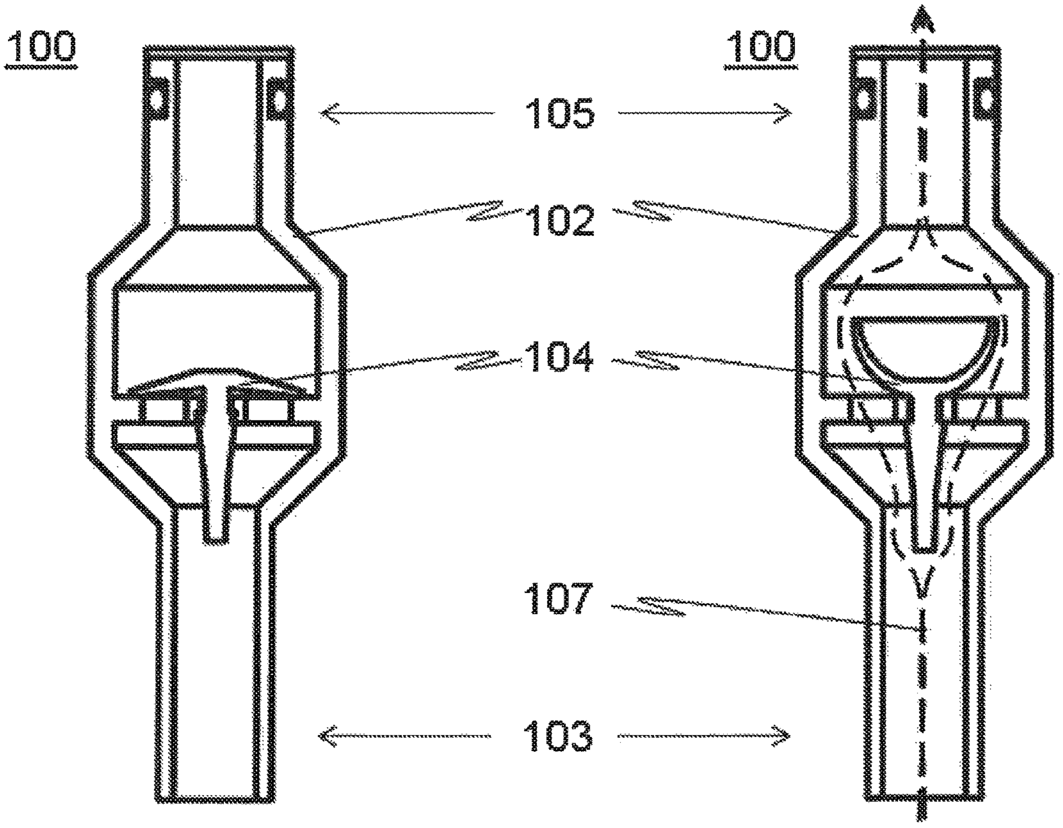
FIG 1C
FIG 1D

BEVERAGE DISPENSING CONDUIT REDUCING MICROBIAL BACKFLOW

FIELD OF THE INVENTION

The invention relates to a fluid conduit, a beverage container, and a beverage dispensing assembly.

BACKGROUND

In known beverage dispensing assemblies, a beverage is typically held in a beverage container, such as a pressurisable keg, that is fluidly coupled via a dispensing line to a dispenser, e.g. a faucet. The dispenser may be operated as desired to flow an amount of beverage from the container through the dispensing line to a dispensing opening of the dispenser for dispensing the beverage in a suitable receptacle such as a drinking glass or cup. Usually the beverage container is detachably coupled to the dispensing line and dispenser in order to allow an exchange of beverage containers. For example once a beverage container is emptied, i.e. has no or not sufficient beverage remaining for dispensing, such container may be uncoupled from the dispensing line and be replaced by a beverage container holding a fresh amount of beverage in order to allow further dispensing of beverage with the dispenser. During its lifetime in use, the dispensing assembly is exposed to microorganisms present in the environment of the dispensing assembly. These microorganisms pose a risk of infiltrating particularly the dispensing line, for example during an exchange of beverage containers when the uncoupled dispensing line is open at its coupling end, and thus exposed to the environment. Upon a following coupling of the dispensing line to a new beverage container holding a fresh amount of beverage such microorganisms may migrate from the dispensing line into the beverage kept in the beverage container which forms a suitable and sufficient source of nutrients for the microorganisms to expand rapidly by multiplication. This provides the problem of contaminating the beverage. As a result, the shelf life of such beverage contained in the beverage container, i.e. period in which the beverage in the container may normally be suitably consumed, may decrease and/or the beverage may prematurely become spoiled otherwise. Furthermore, if the beverage has a low alcohol by volume percentage, or is completely alcohol free, and/or has a relatively high sugar content, such as some alcohol free beers, the beverage is particularly susceptive for contamination by fermenting microorganisms such as wild yeast, which may lead to unwanted increase of alcohol contents in the beverage due to fermentation.

Known beverage dispensing assemblies employ cooling of the beverage container and the beverage held therein, such that, in case contamination of the container does occur, the applied low temperature minimises or prevents growth and reproduction rates of the microorganisms in the beverage, maintaining a contamination level within acceptable limits.

Known beverage dispensing assemblies thus require cooling means, such as a refrigerator, arranged for cooling at least the beverage container particularly to temperatures of 4° Celsius or lower. A drawback of these known assemblies is the needed extra space for provision of such cooling means near to the beverage container, which is often not available. Moreover, cooling an entire beverage container with beverage is also rather time and energy consuming, which is particularly disadvantageous when the container has a relatively large volume and/or needs to be replaced regularly. During this time to cool the beverage container, the beverage container can not be connected to a potentially contaminated beverage dispenser without risking contamination of the beverage in the beverage container.

It is an object of the invention to provide a beverage dispensing assembly which slows down spoiling of the beverage. In particular, it is an object of the invention to prevent microorganism contamination of the beverage container of such beverage dispensing assembly. More particular, it is an object of the invention to provide a beverage dispensing assembly that prevents alcohol formation in the beverage container, without need of cooling the beverage container.

SUMMARY

A first aspect provides a fluid conduit for providing a fluid connection between a beverage container and a beverage dispenser, comprising a conduit body with a container side and a dispenser side, in use downstream of and/or opposite to the container side, wherein the conduit body defines a flow path through the fluid conduit between the container side and the dispenser side, and a flow restrictor provided in the flow path arranged to allow a flow of fluid from the container side to the dispenser side and at least substantially restrict passage of micro-organisms from the dispenser side to the container side through the conduit body.

The flow restrictor may thus allow a flow of beverage out of the beverage container downstream to the beverage dispenser, whilst restricting, substantially restricting and/or blocking micro-organisms such as wild yeast from entering the beverage container through the same flow path as the flow path for the beverage, when no beverage flows out of the container, i.e. when the beverage dispensing assembly is idle or in between separate dispensing operations of the beverage dispensing assembly.

Microorganisms may be yeasts, bacteria, and/or fungi. In particular, yeast may be *Saccharomyces* species such as *Saccharomyces cerevisiae diastaticus, Saccharomyces eubayanus*, and/or *Saccharomyces pasteurianus*.

The fluid conduit may be disposable. Being disposable may imply that the fluid conduit is relatively cheap and/or easy to manufacture and may be disposed of, e.g. discarded, after use thereof. As such, the fluid conduit may be made entirely out of polymers suitable for flow of beverage there through, for example silicone. Thus, the fluid conduit may comprise a plastic tube or be made out of a plastic tube. The fluid conduit may optionally be recyclable or made of recyclable material.

In an embodiment, the flow restrictor is arranged to at least substantially restrict passage of yeast as a microorganism from the dispenser side to the container side through the conduit body.

In a further embodiment, the flow restrictor is arranged to fully restrict and/or block passage of wild yeast as a microorganism from the dispenser side to the container side through the conduit body. To fully restrict and/or block may imply that, when the fluid conduit is in use, no wild yeast cells can reach the container side of the fluid conduit from the dispenser side.

The flow restrictor may comprise or consist of a filter, in particular a mesh screen and/or membrane, for at least substantially restricting and/or blocking passage of microorganisms through the filter from the dispenser side to the container side. The filter may be provided in the flow path of the fluid conduit.

Embodiments of the filter may have pores with a pore size adapted to restrict passage of micro-organisms whilst allowing flow of beverage. In particular, embodiments of the filter may have pores with a pore size between 0.2 and 40 μm, particularly between 0.2 and 30 μm, between 5 and 20 μm, and/or between 7 and 10 μm, and/or pores with a pore size smaller than the size of yeast cells, for example yeast cells of yeast belonging to the *Saccharomyces* species. The pore sizes may determine the maximum size of a particle, e.g. a micro-organism, which can pass through the filter. The maximum size may for example be a maximum width, length and/or depth of a particle, or a maximum diameter.

In embodiments, the flow restrictor may comprise or consist of a one-way valve, operable by virtue of a fluid pressure on the container side of the fluid conduit. The one-way valve may be provided in the flow path of the fluid conduit. When the fluid pressure on the container side exceeds a fluid pressure on the dispenser side, the one-way valve may allow a downstream flow of beverage through the one-way valve from the container side to the dispenser side.

The fluid pressure on the container side may exceed the fluid pressure on the dispenser side by virtue of a pressurised gas, such as CO2 or NO2, supplied to the beverage container. The pressure exerted by the pressurised gas may exceed ambient pressure at the dispenser side, for example when a beer tap as a beverage dispenser is opened to dispense beer.

Once the fluid pressures on the container side and the dispenser side of the fluid conduit are equal, substantially equal, and/or the pressure on the dispenser side exceeds the pressure on the container side, the one-way valve restricts flow of fluid from the dispenser side to the container side. Hence, in use, it may be prevented or at least substantially prevented for fluid to flow back upstream into the beverage container. Micro-organisms present in the beverage dispenser, such as wild yeast, are thereby prevented from contaminating the beverage inside the beverage container.

In an embodiment the one-way valve may be a duckbill valve. The duckbill valve, in an opened state, may provide in particular embodiments a substantially oval flow-through area.

For coupling a disposable fluid conduit to a beverage container, e.g. a beer keg, embodiments of the fluid conduit may comprise attachment means for attachment to a container body of the beverage container. For example the fluid conduit may comprise a coupler body arranged to be fitted on the container body at a fluid outlet of the container body. The fluid conduit may particularly be arranged to be fitted to an head of an extractor tube, also known as the keg spear or down tube, of the beverage container, e.g. keg.

A plastic tube or other fluid conduit extends from the coupler body to a coupling end for coupling to a dispensing line. The fluid conduit may comprise at the coupling end coupling means for coupling to a dispenser. The fluid conduit may particularly be coupled to a dispensing line part of a dispenser. For example the coupling means may comprise a snap-fit connector for coupling to corresponding snap-fit means of the dispensing line part. The fluid conduit may be a first dispensing line part fitted with a coupling end comprising releasable or reversible snapping means arranged to snap into a cavity of coupling means at the coupling end of a second dispensing line part of a dispenser to allow for coupling and decoupling of the first and second dispensing line parts. Preferably a beverage dispensing assembly is provided by coupling of the beverage container, comprising the disposable fluid conduit attached to the container body, to the second dispensing line part. The fluid conduit and the container body may be preassembled to form the beverage container. The fluid conduit and the container body may be sterilized after preassembling thereof and/or are, preferably, preassembled in a sterile environment. Preferably the fluid conduit and the container body are maintained sterile, i.e. closed off from the environment, until coupling thereof to the second dispensing line part and/or dispenser to form the beverage dispensing assembly. For example a free coupling end of the fluid conduit for coupling to the second dispensing line part may be closed prior to coupling, e.g. by means of a seal. The seal may be openable or removable at least in part, as to allow a flow of beverage through the dispensing line after coupling of the fluid conduit and second dispensing line part. The seal may for example comprise a foil attached at and spanning over the free coupling end of the fluid conduit. The foil may for example be perforated upon coupling to the second dispensing line part or may be manually peeled off the coupling end of the fluid conduit prior to coupling to the second dispensing line part, to open the flow path through the dispensing line.

The second dispensing line part may for example be formed by a normal beer tube that is connected to a dispenser, such as a faucet, comprising the dispensing opening. The second dispensing line part may be removably connected to the dispenser. The second dispensing line part and the dispenser may be preassembled.

The disposable fluid conduit in accordance with the foregoing allows coupling and uncoupling, i.e. exchange, of beverage containers to an existing dispenser on site, such as in a bar, with a reduced risk of microorganisms which may be present in the second part of the dispensing line or the dispenser, or which may enter the second part of the dispensing line during coupling, from migrating into a beverage chamber of the coupled beverage container.

In a preferred embodiment, the fluid conduit is at the container side of the conduit body essentially or fully free of wild yeast.

A further aspect provides a beverage container assembly, comprising a beverage container, comprising a container body with a beverage chamber for containing a beverage, an extractor tube, arranged to provide a fluid outlet for beverage inside the storage body, the extractor tube comprising an extractor tube head, and a disposable fluid conduit according to the first aspect, wherein the fluid conduit is fitted to the head of the extractor tube, and the fluid conduit is provided in fluid connection with the fluid outlet conduit, such that the container side of the fluid conduit faces towards the fluid outlet conduit.

The container body may be preassembled with the disposable fluid conduit to form a beverage container assembly according to the second aspect in a facility which has been cleaned to ensure that there is no or substantially no wild yeast present which may contaminate the head of the extractor tube and/or the container side of the fluid conduit.

A third aspect provides a beverage container assembly, comprising a beverage container, comprising a storage body for containing a beverage, an extractor tube, arranged to provide a fluid outlet for a beverage inside the storage body and comprising an extractor tube head. The beverage container assembly according to the third aspect further comprises a disposable coupler arranged to couple the beverage container to a dispensing line, comprising a coupler body, fitted to the head of the extractor tube, a beverage tube extending from the coupler body, provided in fluid connection with the fluid outlet of the extractor tube to provide a flow path through the disposable coupler, and a fluid conduit according to the first aspect, provided in the flow path through the disposable coupler.

For fitting a coupler or coupler body to a head, for example a rotational movement of the coupler relative to the head may be required.

A fourth aspect provides a disposable coupler arranged to be fitted to a beverage container, comprising a coupler body, arranged to be fitted to a fluid outlet of the beverage container, a beverage tube extending from the coupler body to provide a flow path for a beverage, and a fluid conduit according to the first aspect, provided in the flow path of the beverage tube.

The fluid conduit may be provided at or near a proximal end of the beverage tube, at or near a distal end of the beverage tube, and/or as a part of the beverage tube itself. As such, the conduit body may be comprised by the beverage tube.

A fifth aspect provides a beverage dispensing assembly, comprising a dispenser with an outlet opening for dispensing the beverage, and a dispensing line arranged to be provided between a beverage container and the dispenser to form a flow path enabling a flow of beverage from the container to the dispensing opening, wherein the dispensing line is provided with a fluid conduit according to the first aspect, and wherein the flow path through the dispensing line passes through the fluid conduit.

In embodiments, a beverage dispensing assembly according to the fifth aspect further comprises a beverage container arranged for holding a beverage.

With the beverage dispensing assembly according to the fifth aspect, migration of micro-organisms upstream towards the beverage container may be at least substantially prevented by virtue of the flow restrictor of the fluid conduit. This upstream migration may have otherwise taken place via the flow path provided by the dispensing line between the beverage container and the dispenser, which dispensing line may have been contaminated with micro-organisms such as wild yeast.

When the dispensing line comprises a coupler, the fluid conduit may be provided between the beverage container and the coupler. The coupler may be used to connect a beverage container to the dispensing line. For example, a coupler may be arranged to be connected to a head of an extractor tube of a beer keg.

The coupler, dispensing line and/or dispenser may be contaminated with micro-organisms such as wild yeast. By providing the fluid conduit between the beverage container and the coupler, it may be prevented or at least substantially prevented that micro-organisms migrate from one of the contaminated components into the beverage container.

A beverage container may contain a beverage having an alcohol by volume percentage of 2% or less, 1.2% or less, 0.5% or less, or be essentially free of alcohol. The beverage may be an alcohol-free or low alcohol by volume malt beverage, for example, alcohol-free beer, or an alcohol-free fermented fruit beverage, for example, alcohol-free cider. The beverage may comprise carbohydrates, which may be converted into CO2 and alcohol by wild yeast.

A sixth aspect provides a method for refilling a reusable beverage container, comprising the steps of removing a disposable fluid conduit according to the first aspect from the beverage container, refilling the beverage container with beverage which is one of a beverage comprising carbohydrates, a beverage with an alcohol by volume content of less than 2%, and a beverage with an alcohol by volume content of less than 0.2%, and providing a new fluid conduit according to the first aspect to a fluid outlet conduit of the beverage container, such that the fluid conduit at least substantially restrict passage of micro-organisms through the conduit body from the dispenser side to the container side into the beverage container.

By providing the new fluid conduit to the fluid outlet of the beverage container, the container side of the fluid conduit may be substantially sealed off from the environment, and as such be protected from contamination by micro-organisms, in particular wild yeast.

A seventh aspect provides a method for refilling a reusable beverage container, comprising the steps of, removing a disposable coupler according to the second aspect from the beverage container, refilling the beverage container with beverage which is one of a beverage comprising carbohydrates, a beverage with an alcohol by volume content of less than 2%, and a beverage with an alcohol by volume content of less than 0.2%, and a step of fitting a new disposable coupler according to the second aspect to a fluid outlet of the beverage container.

By fitting the new disposable coupler to the fluid outlet of the beverage container, the container side of the fluid conduit may be substantially sealed off from the environment, and as such be protected from contamination by micro-organisms, in particular wild yeast.

The methods according to the sixth and seventh aspect may be performed in an environment essentially free of micro-organisms, or in particular essentially free of wild yeast to prevent contamination of the container side of the fluid conduit.

It will be appreciated that the general inventive concept of the fluid conduit according to the first aspect may be applied in different situations related to beverage containers and preventing or at least substantially preventing contamination of a beverage inside the beverage container with micro-organisms such as wild yeast. The fluid conduit may thus be provided as a part of the beverage container, in an assembly with the beverage container, in a beverage dispensing line, as a part of a disposable coupler and/or in a beverage dispensing system with the same general concept of allowing a flow of fluid from the container side to the dispenser side and at least substantially restricting passage of micro-organisms through the conduit body from the dispenser side to the container side.

BRIEF DESCRIPTION OF THE FIGURES

The various aspects and embodiments will be elaborated on in conjunction with figures. In the figures, FIGS. 1A and 1B depict an embodiment of a fluid conduit in a closed state and an opened state, respectively;

FIGS. 1C and 1D depict a further embodiment of a fluid conduit in a closed state and an opened state, respectively;

DETAILED DESCRIPTION OF THE FIGURES

Figure 2A:
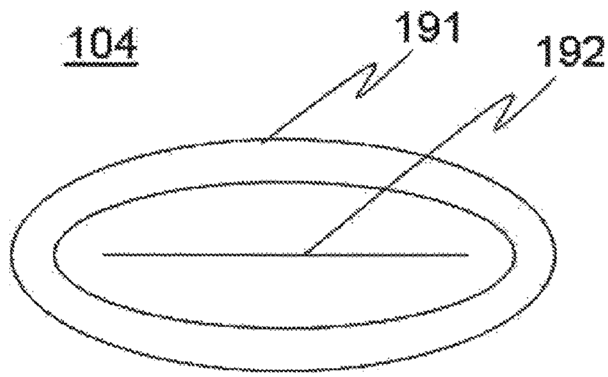
FIGS. 2A and 2C depict a front view of an embodiment of a duckbill valve, in a closed state and an opened state, respectively.

FIGS. 1A and 1B depict a piece of tubing 100 as a fluid conduit for providing a fluid connection between a beverage container and a beverage dispenser. The tubing 100 comprises a tubing body 102 as a conduit body, with a container side 103 and a dispenser side 105. The tubing body 102 defines a fluid flow path 107 through the tubing 100 between the container side 103 and the dispenser side 105, in an opened state as shown in FIG. 1B. In the closed state as shown in FIG. 1B, a duckbill valve 104 as a flow restrictor at least substantially restricts passage of micro-organisms such as yeast through the tubing body 102 from the dispenser side 103 to the container side 105.

FIGS. 1C and 1D depict a further embodiment of a piece of tubing 100 as a fluid conduit, wherein the flow restrictor is an umbrella valve 104. The umbrella valve 104 is in FIGS. 1C and 1D respectively shown in a closed state and an open state, wherein in the closed state the umbrella valve 104 substantially restricts passage of micro-organisms such as yeast through the tubing body 102 from the dispenser side 103 to the container side 105. In the opened state, the umbrella valve 104 allows a flow path 107 for fluid through the tubing 100 between the container side 103 and the dispenser side 105.

Further embodiments of the fluid conduit are envisioned wherein the flow restrictor 104 is embodied different than an umbrella valve of a duckbill valve. For example, the flow restrictor may comprise a filter for at least substantially restricting passage of micro-organisms through the filter from the dispenser side to the container side. In other examples, the flow restrictor may comprise a one-way valve, check valve, non-return valve, reflux valve, retention valve, clack valve, any other component arranged to restrict flow, or any combination thereof.

Embodiments of fluid conduits are also envisioned comprising more than one flow restrictor, provided in series, parallel, or in a combination thereof. In such embodiments, one or more flow restrictors according to one or more of the embodiments of flow restrictors as disclosed herein may be used.

The flow restrictor, for example embodied as the duckbill valve 104 and umbrella valve 104 shown in FIGS. 1A and 1B, 1C and 1D, respectively, may be operable by virtue of a pressure difference between the pressure in the fluid at the container side 103, and the pressure in the fluid at the dispenser side 105. When the pressure in the fluid at the container 103 is higher than the pressure in the fluid at the dispenser side 105, the flow restrictor may be pressed into the opened state by virtue of this pressure difference. When a filter is used as a flow restrictor, the filter may not be opened or closed, but remains in a single state independent of a pressure difference over the filter.

Figure 2B:
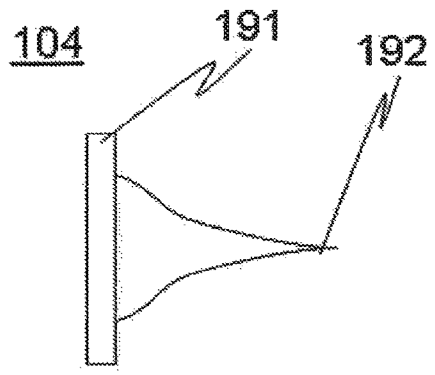
FIGS. 2B and 2D depict a cross-sectional view of the embodiment of the duckbill valve, in a closed state and an opened state, respectively.
Figure 2C:
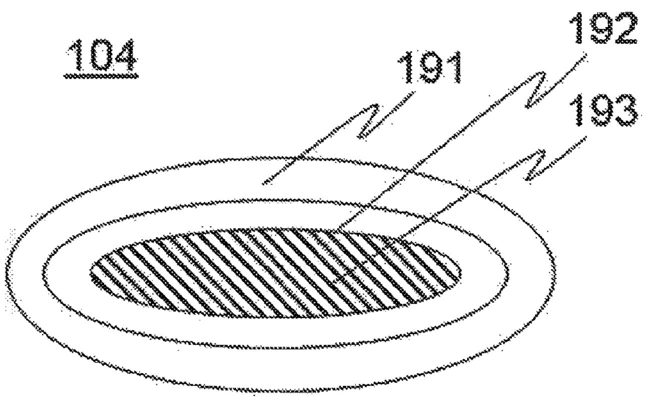
Figure 2D:
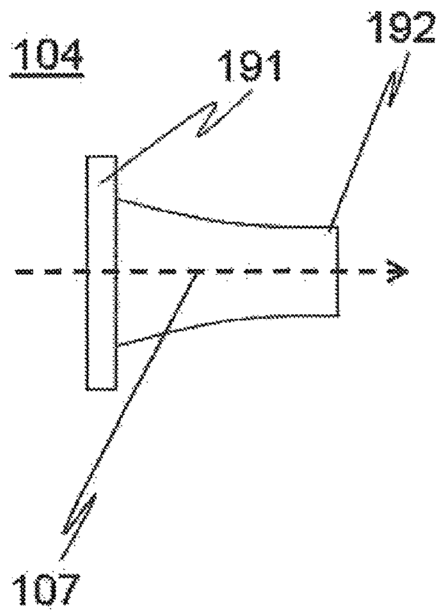

In FIGS. 2A, 2B, 2C, and 2D an embodiment of a duckbill valve 104 is depicted. FIGS. 2A and 2C show a front view of the duckbill valve 104, in a closed state and an opened state respectively. FIGS. 2B and 2D show a cross-sectional view of the duckbill valve 104, in a closed state and an opened state respectively.

The duckbill valve 104 comprises a base 191 and a mouth 192. In the closed state, the mouth 192 may at least substantially restrict passage of micro-organisms. In the particular embodiment of FIGS. 2A, 2B, 2C, and 2D, in the opened state, the mouth 192 provides a substantially oval flow-through area 193, shown hatched. As such, the duckbill valve 104 has a flow-through area with a substantially oval shape perpendicular to the flow direction 107. The base 191 of this particular embodiment of the duckbill valve 104 is also substantially oval.

Figure 3A:
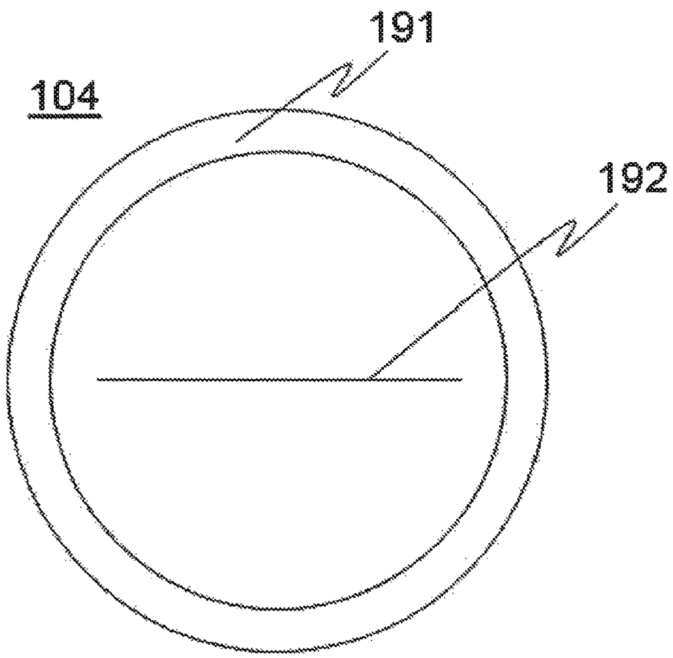
FIGS. 3A and 3C depict a front view of another embodiment of a duckbill valve, in a closed state and an opened state, respectively.
Figure 3B:
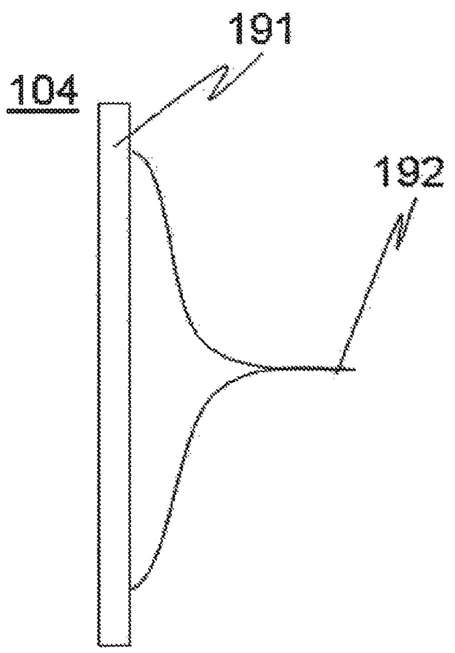
FIGS. 3B and 3D depict a cross-sectional view of the embodiment of the duckbill valve, in a closed state and an opened state, respectively.
Figure 3C:
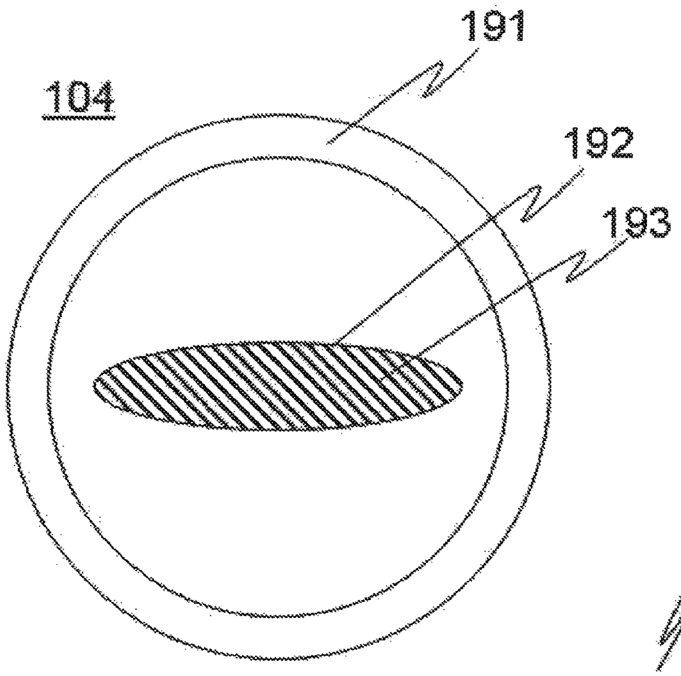
Figure 3D:
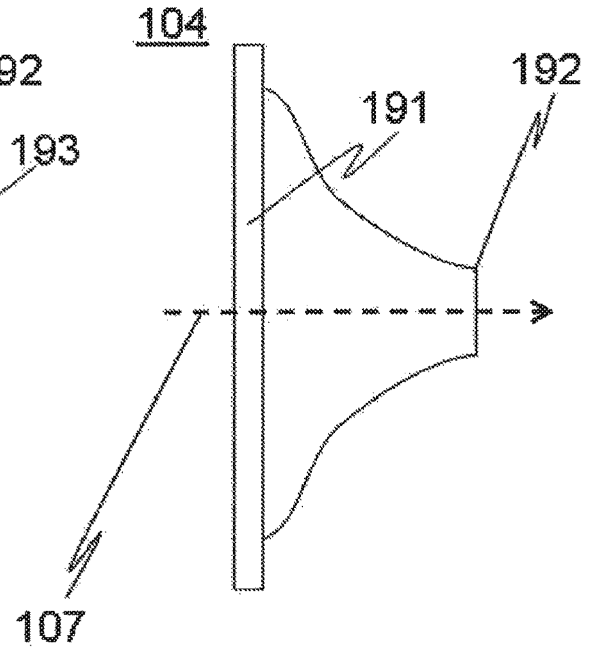

In FIGS. 3A, 3B, 3C, and 3D another embodiment of a duckbill valve 104 is depicted. FIGS. 3A and 3C show a front view of the duckbill valve 104, in a closed state and an opened state respectively. FIGS. 3B and 3D show a cross-sectional view of the duckbill valve 104, in a closed state and an opened state respectively.

The duckbill valve 104 comprises a base 191 and a mouth 192. In the closed state, the mouth 192 may at least substantially restrict passage of micro-organisms. In the particular embodiment of FIGS. 3A, 3B, 3C, and 3D, in the opened state, the mouth 192 provides a substantially oval flow-through area 193, shown hatched. As such, the duckbill valve 104 has a flow-through area with a substantially oval shape perpendicular to the flow direction 107. The base 191 of this particular embodiment of the duckbill valve 104 is substantially circular. As such, the flow through area transitions from being substantially circular at the base 191 to being substantially oval at the mouth 192.

The oval shape may allow a faster closure of the one-way valve when the pressure at the container side does not exceed the pressure at the dispenser side anymore, and may thus further decrease risk of contamination.

In other embodiments of the one-way valve, the flow-through area at any point between the base 191 and the mouth 192 may have a different shape, such as a substantially round or circular shape, a rectangular shape, optionally with rounded edges, any other shape, or any combination thereof.

Figure 4:
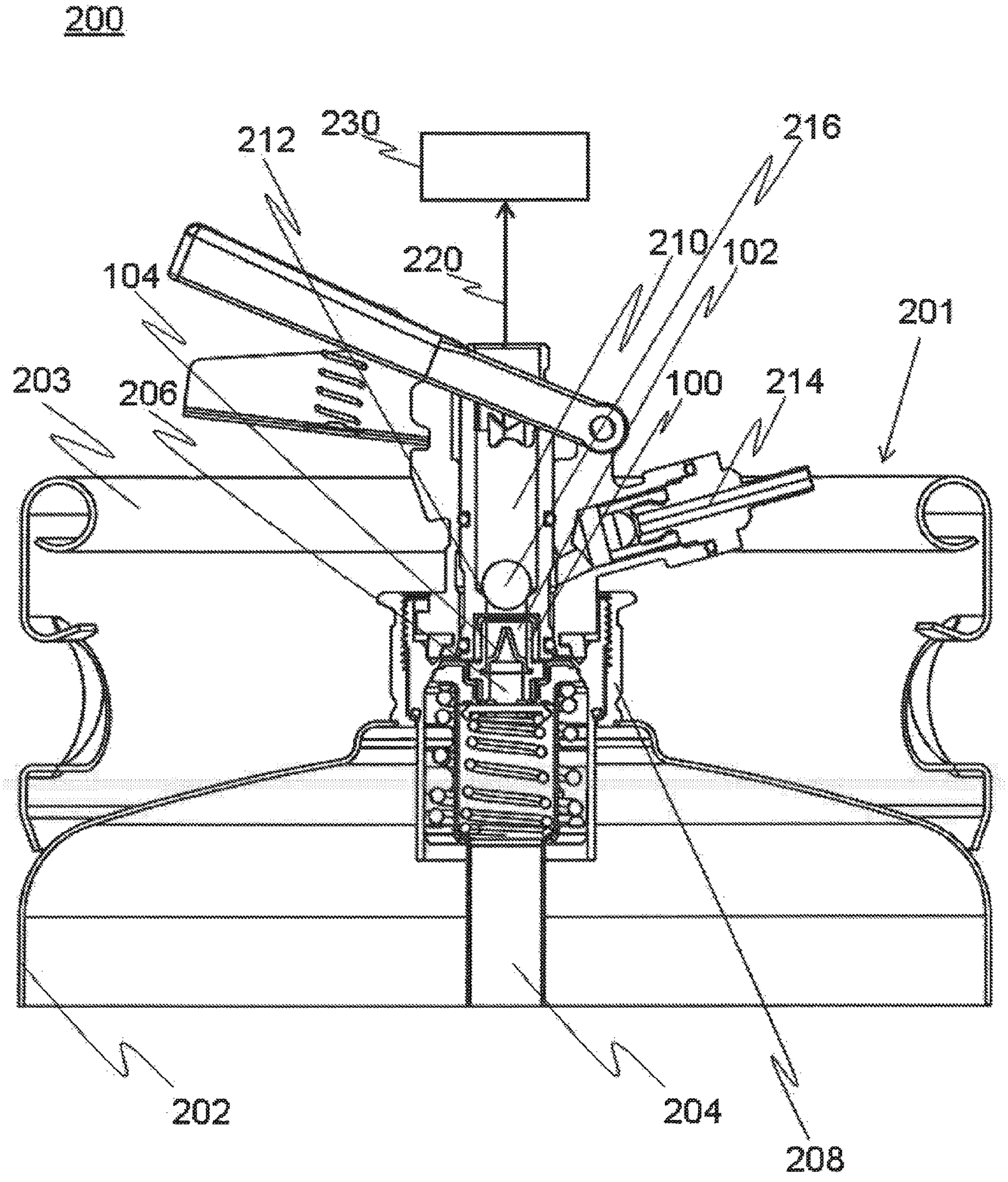
FIG. 4 shows part of an embodiment of a beverage dispensing assembly.

FIG. 4 shows part of an embodiment of a beverage dispensing assembly 200, comprising a beer keg 201 as a beverage container. The keg 201 comprises a keg body 202 as a storage body for containing beer as a beverage, with a carrying rim 203. The keg 201 further comprises an extractor tube 204 arranged to provide a fluid outlet 206 for beer in the keg body 202. At least part of the extractor tube 204 is inserted into the keg body 202. The extractor tube 204 comprises a head 208, which in this particular embodiment as an option extends out of the keg body 202.

Connected to the head 208 is a coupler 210, arranged to connect the keg 201 to a dispensing line 220 and via the dispensing line 220 to a tap 230 as a dispenser. For clarity and conciseness of the figure, the dispensing line 220 and tap 230 are only schematically shown.

The coupler 210 comprises a fluid inlet 212, arranged to receive a beverage as a fluid from the fluid outlet 206 of the keg 201. The coupler 210 further comprises a pressurised gas inlet 214, and when the coupler 210 is coupled to the keg 201, via the pressurised gas inlet 214, pressurised gas may be provided into the keg body 202 for pressurising the beverage in the keg body 202.

In the particular embodiment as shown in FIG. 4, a fluid conduit 100 is provided between the fluid outlet 206 of the keg 201 and the fluid inlet 212 of the coupler 210. The fluid conduit 100 comprises a conduit body 102 and a duckbill valve 104 as a flow restrictor. The duckbill valve 104 is in FIG. 4 shown in a closed state. In the closed state, the duckbill valve 104 at least substantially restricts passage of micro-organisms through the conduit body 102 from the dispenser side to the container side.

If the tap 230 is opened, by virtue of the gas pressure on the beverage in the keg body 202, beverage may flow via the extractor tube 204, through the keg fluid outlet 206 to the duckbill valve 104, which will open by virtue of the pressurised beverage. The beverage then flows out of the fluid conduit 100 into the coupler fluid inlet 212, and via the coupler 210 and the dispensing line 220 out of the tap 230.

When the tap 230 is closed again, the flow of beverage is halted, and the pressure on both sides of the duckbill valve 104 is substantially equalised. By virtue of the resilient material comprised by the duckbill valve 104, the duckbill valve returns in the closed state, and in this closed state substantially or entirely restricts or blocks passage of micro-organisms through the conduit body 102 from the dispenser side of the conduit body 102 to the container side of the container body 202.

Even if the keg 201 is not used for a longer time and the keg 201 is not cooled, no path is provided for micro-organisms to migrate into the keg 201 via the keg fluid outlet 206 because the flow of micro-organisms through the fluid conduit is at least substantially restricted and/or blocked.

A coupler 210 may comprise a check ball 216 for preventing beer to flow out of the coupler 210 through the coupler fluid inlet 212 when the coupler 210 is removed from the keg 201 and there is still fluid left in the dispensing line 220.

When the coupler 210 is not coupled to a keg 201, part of the check ball 216 and other parts of the coupler 210 may be exposed to ambient air, which may contain wild yeast cells and/or other micro-organisms, or touched by a person handling the coupler 210, who may have wild yeast cells and/or other micro-organisms on his hands. As such, the check ball 216 and/or other parts of the coupler 210 may be contaminated.

When a coupler 210 with a contaminated check ball 216 and/or other parts is again coupled to a keg 201, a fluid conduit 100 according to the first aspect may prevent or at least substantially restrict contaminants such as wild yeast from migrating into the keg 201.

Figure 5:
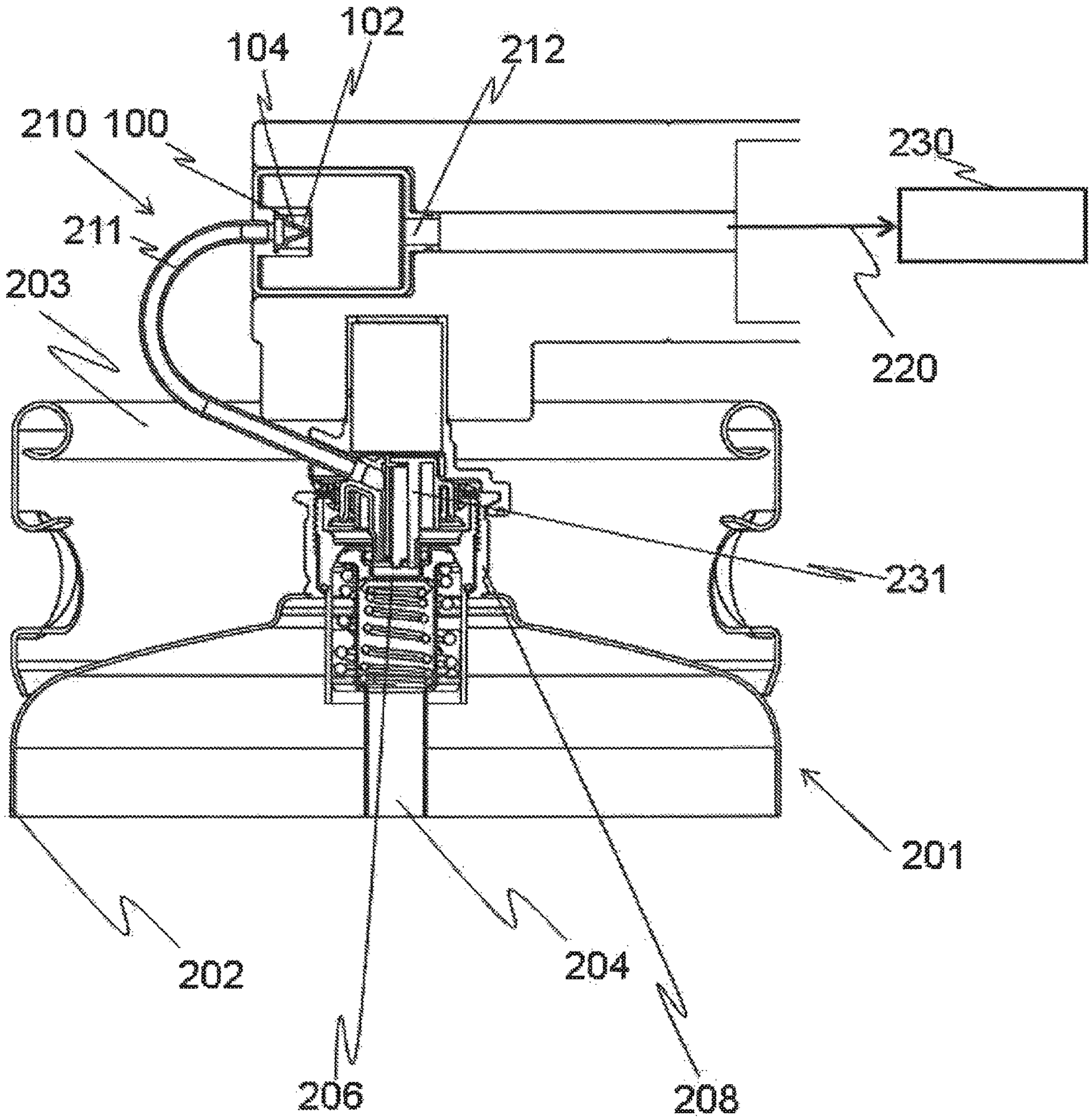
FIG. 5 shows part of another embodiment of a beverage dispensing assembly.

FIG. 5 shows part of another embodiment of a beverage dispensing assembly 200. The beverage dispensing assembly 200 comprises the keg 201 as a beverage container, comprising keg body 202 as the storage body for containing e.g. alcohol-free beer as a beverage. The keg 201 comprises extractor tube 204, which provides the keg fluid outlet 206, and comprises head 208, which in this particular embodiment extends out of the keg body 202.

Fitted to the head 208 of the keg body 202 is a disposable coupler 210 arranged to couple the keg 201 to a dispensing line 220. The disposable coupler 210 comprises a coupler body 231 fitted to the head 208 when the assembly 200 is assembled.

The disposable coupler 210 further comprises a beer tube 211 as a beverage tube extending from the coupler body 231, which beer tube 211 is provided in fluid connection with the keg fluid outlet 206 when the coupler 210 is coupled to the keg 201.

The disposable coupler 210 is provided with an embodiment of the fluid conduit 100, here provided at a distal end of the beer tube 211, and as such provided in a flow path for beverage through the disposable coupler 210. The fluid conduit 100 as shown in FIG. 5 comprises a duckbill valve 104 as the flow restrictor and is shown in the closed state.

The invention claimed is:

1. Beverage container assembly, comprising
   - a beverage container with a storage body for containing a beverage and an extractor tube, arranged to provide a fluid outlet for a beverage from inside the storage body, and comprising an extractor tube head, and
   - a coupler to be coupled to the extractor head, the beverage container assembly further comprising
   - a conduit body with a container side fitted to the extractor tube head in fluid connection with the fluid outlet, and
   - a dispenser side, in use downstream of the container side, for coupling to the coupler connected to a dispensing line,
     - wherein the conduit body defines a flow path through a fluid conduit between the container side and the dispenser side; and
   - a flow restrictor provided in the flow path, arranged to allow a flow of fluid from the container side to the dispenser side, and at least restrict passage of micro-organisms through the conduit body from the dispenser side to the container side, wherein the fluid conduit is removably provided between the extractor head and the coupler.

2. Beverage container assembly according to claim 1, wherein the flow restrictor comprises a one-way valve, operable by virtue of a downstream fluid pressure on the container side of the valve.

3. Beverage container assembly according to claim 2, wherein the one-way valve is a duckbill valve.

4. Beverage container assembly according to claim 3, wherein the duckbill valve, in an opened state, provides a substantially oval flow-through area.

5. Beverage container assembly according to claim 2, wherein the one-way valve is an umbrella valve.

6. Beverage container assembly according to claim 1, wherein the container side of the conduit body is essentially free of wild yeast.

7. Beverage container assembly according to claim 1, wherein the beverage container comprises one of:
   - a beverage comprising carbohydrates;
   - a beverage with an alcohol by volume content of less than 2%; and
   - a beverage with an alcohol by volume content of less than 0.2%.

8. Method for refilling a beverage container of a beverage container assembly according to claim 1, comprising the steps of:
   - removing the fluid conduit from the beverage container;
   - refilling the beverage container with beverage which is one of:
     - a beverage comprising carbohydrates;
     - a beverage with an alcohol by volume content of less than 2%; and
     - a beverage with an alcohol by volume content of less than 0.2%; and
   - providing a new fluid conduit comprising a conduit body with a container side and a dispenser side, in use downstream of the container side, wherein
   - the conduit body defines a flow path through the fluid conduit between the container side and the dispenser side; and
   - a flow restrictor is provided in the flow path, arranged to
     - allow a flow of fluid from the container side to the dispenser side; and
     - at least restrict passage of micro-organisms through the conduit body from the dispenser side, to the container side, to the fluid outlet of the beverage container, such that the fluid conduit at least substantially restricts passage of microorganisms through the conduit body from the dispenser side to the container side into the beverage container.

9. Method for refilling a beverage container of a beverage container assembly according to claim 8, comprising the step of disconnecting the beverage container from a beverage dispenser by disconnecting the coupler from the beverage container and removing the fluid conduit.

10. Fluid conduit according to claim 1, wherein the flow restrictor comprises a filter for at least substantially restricting passage of micro-organisms through the filter from the dispenser side to the container side.

11. Fluid conduit according to claim 10, wherein the filter has pores with a pore size between 0.2 and 40 μm.

12. Fluid conduit according to claim 1, wherein the flow path at a coupling end of the conduit body for coupling to the dispensing line is sealed off by a seal.

13. Beverage container assembly according to claim 12, wherein the seal comprises a peel seal.

14. A beverage dispensing assembly, comprising a beverage container with a container beverage outlet, a dispenser with an outlet opening for dispensing a beverage; and a dispensing line, arranged between the beverage container and the dispenser to form a flow path enabling a flow of beverage from the container to the outlet opening;

wherein the dispensing line is connected to a coupler to be coupled to the container at the container beverage outlet, wherein a fluid conduit is provided between the container beverage outlet and the coupler, during use, forming a fluid connection between the container beverage outlet and the coupler, fluidly connecting to the dispensing line, wherein a flow restrictor is provided in the fluid conduit, allowing beverage flow from the container beverage outlet into the dispensing line through the coupler, but restricting passage of micro-organisms through the fluid conduit from the coupler to the container beverage outlet, and wherein the fluid conduit is releasably connected to the coupler.

15. Beverage dispensing assembly according to claim 14, wherein the beverage container contains a beverage having an alcohol by volume percentage of 2% or less.

16. Beverage dispensing assembly according to claim 15, wherein the beverage is essentially free of alcohol.

17. Beverage dispensing assembly according to claim 16, wherein the beverage is an alcohol-free malt-based beverage.

18. A coupler assembly arranged to be fitted to a beverage container, comprising a coupler and a coupler body, arranged to be fitted to a fluid outlet of the beverage container, a beverage dispensing line extending from the coupler body to provide a flow path for a beverage; and a fluid conduit comprising a conduit body with a container side and a dispenser side, in use downstream of the container side, wherein the conduit body defines a flow path through the fluid conduit between the container side and the dispenser side;

wherein a flow restrictor is provided in the flow path, arranged to allow a flow of fluid from the container side to the dispenser side and at least restrict passage of micro-organisms through the conduit body from the dispenser side to the container side, wherein the container side of the conduit body is connected to an outlet channel of the coupler body, and the dispenser side of the conduit body is connected to an inlet side of the coupler connected to the beverage dispensing line, such that a beverage flow path is provided through the coupler body, the conduit body, the flow restrictor inside the conduit body, the coupler, and the beverage dispensing line, and, wherein the fluid conduit is releasably connected to the coupler.

19. Beverage container assembly, comprising a beverage container with a storage body for containing a beverage, and an extractor tube, providing a fluid outlet for a beverage inside the storage body and comprising an extractor tube head, further comprising a coupler assembly according to claim 18, wherein the coupler is connected to the fluid outlet.

20. Method for refilling a beverage container of a beverage container assembly according to claim 19, comprising the steps of:

removing the coupler from the beverage container;

refilling the beverage container with beverage which is one of:

a beverage comprising carbohydrates;

a beverage with an alcohol by volume content of less than 2%; and a beverage with an alcohol by volume content of less than 0.2%; and fitting a new coupler to a fluid outlet of the beverage container.

21. Method for refilling a beverage container of a beverage container assembly according to claim 20, comprising the step of disconnecting the beverage container from a beverage dispenser by disconnecting the coupler from the beverage container and removing the fluid conduit.

22. Beverage container assembly according to claim 21, wherein the beverage side of the fluid conduit is provided with a seal sealing off said dispenser side of the fluid conduit.

23. Beverage container assembly, comprising:

a beverage container with a storage body for containing a beverage, and an extractor tube, providing a fluid outlet for a beverage inside the storage body and further comprising an extractor tube head, and a fluid conduit further comprising a conduit body with a container side and a dispenser side, in use downstream of the container side, wherein the conduit body defines a flow path through the fluid conduit between the container side and the dispenser side; and a flow restrictor is provided in the flow path, arranged to allow a flow of fluid from the container side to the dispenser side, and at least restrict passage of micro-organisms through the conduit body from the dispenser side to the container side, wherein the fluid conduit is fitted to the extractor tube head, such that the container side of the conduit body is in fluid connection with the fluid outlet, and the fluid conduit is provided for enclosure between a coupler of a beverage dispenser and the beverage outlet when the coupler is connected to the container, and wherein the fluid conduit is releasably connected to the coupler.

* * * * *